Oct. 1, 1968   R. L. CRAIN ET AL   3,403,931
CLAMP
Filed Aug. 11, 1964   3 Sheets-Sheet 1

INVENTORS
ROBERT CRAIN
RAYMOND E. LATHAM
BY Cushman, Darby & Cushman
ATTORNEYS

Oct. 1, 1968  R. L. CRAIN ET AL  3,403,931
CLAMP

Filed Aug. 11, 1964  3 Sheets-Sheet 2

INVENTORS
ROBERT CRAIN
RAYMOND LATHAM
BY Cushman, Darby & Cushman
ATTORNEYS

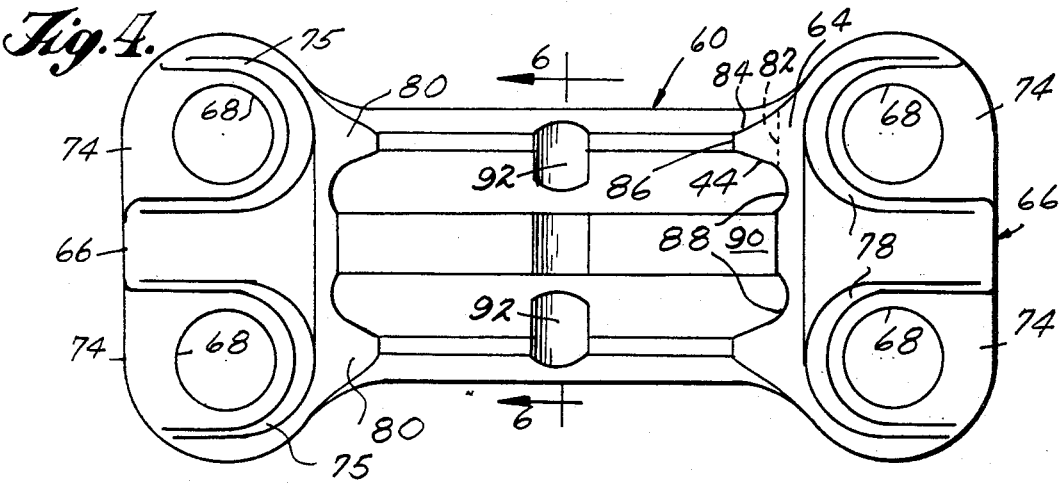
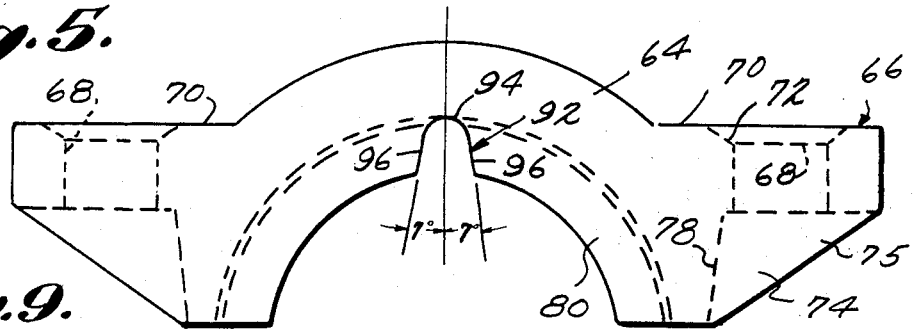
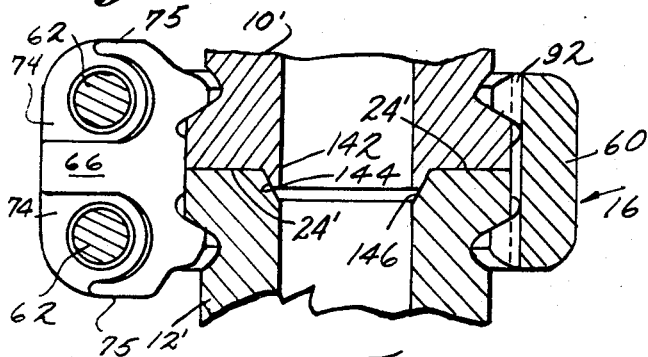
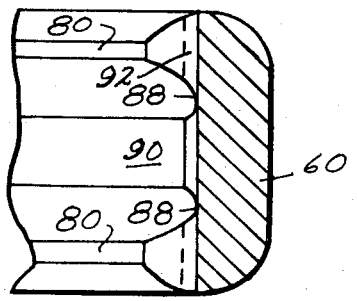
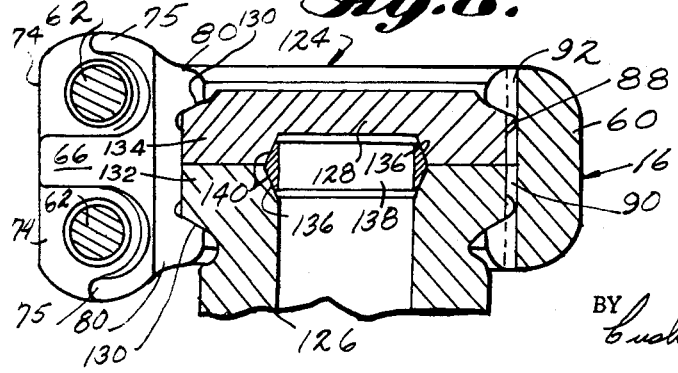

United States Patent Office 3,403,931
Patented Oct. 1, 1968

3,403,931
CLAMP
Robert L. Crain and Raymond E. Latham, Houston, Tex., assignors to Gray Tool Company, Houston, Tex., a corporation of Texas
Filed Aug. 11, 1964, Ser. No. 388,775
1 Claim. (Cl. 285—334.2)

This invention relates to sealed connections designed to withstand extremely high pressures, as well as lower pressures, and is more particularly directed to the clamping means for drawing the ends of the conduit parts or similarly sealable elements together.

It is the principal object of the present invention to provide an improved clamp to draw the ends of two conduits or similarly sealable elements together thereby assuring a tight fit with the sealing means located therebetween.

Heretofore, the principal means for drawing such conduits together was illustrated in Patents 2,766,829, Watts et al., dated Oct. 16, 1956; 2,766,998, Watts et al., dated Oct. 16, 1956; and 2,766,999, Watts et al., dated Oct. 16, 1956 and the present clamp is an improved means for use with the type of joint disclosed by the above patents.

In clamps of this type now in use, as the lugs and arcuate segments are pulled together by tightening the nuts on the bolts extending through the lugs at the opposite ends of the arcuate body of the clamp, an uneven stress distribution of forces begins to build up along the wedge bearing surfaces of the inner arcuate ribs of the clamp. In some cases, the area of contact and hence pressure between the clamp and the conduit parts will vary. Such conditions are not conducive to obtaining the most satisfactory coupling in high pressure systems where equal distribution of forces is essential to the effectiveness of the sealing means.

Therefore, it is an object of this invention to provide a clamp which when tightened will afford a more even distribution of forces than heretofore achieved. Not only are the stresses in the clamp body more uniform, but the clamp sealed member contact area under pressure is more uniform. Such an object is achieved by providing axial grooves on the radially inner side of the arcuate clamp intersecting the wedge bearing ribs.

Furthermore, it is an object of this invention to provide a more effective clamp for drawing the ends of the conduit parts into engagement with annular sealing means such as those disclosed in the Watts et al. patents mentioned above.

Likewise it is an object of the invention to provide a clamp of sufficient mass to withstand the forces exerted at the root section of the axial grooves.

Ancillary to the above objects, it will be noted that the groove allows much greater flexibility of the clamp. This flexibility in turn facilitates easier assembly, reduces galling of the sealing surfaces of the conduits or other elements being coupled and makes feasible the inclusion of larger dimensional tolerances in the conduit components.

Heretofore prior art clamps were made up by tightening the nuts on the bolts, the clamp lugs would be pulled together rotating slightly about their base region. This very slight rotation caused the substantially flat nut bearing surfaces of the lug to bear against the inner edge of the nut and cause a bending stress in the bolt.

Another object of the invention, therefore, is to provide a clamp which will reduce bending stresses in the bolts as the nuts are tightened. Essentially this object is accomplished by providing generally spherically curved seats for nuts having spherically curved surfaces cooperating with the seats.

To the extent that a superior clamp is produced by reducing bending stresses in the bolts, a further object is to provide a superior high pressure coupling including this novelly improved clamp.

A further object of the invention is to provide a safeguard against clamp bolt failure by including two axially spaced laterally extending bolts in each lug. Accordingly, it is an additional object of the invention to provide a sealed coupling with additional clamp makeup bolts to eliminate failure as a result of the overstressing of one bolt.

Various other objects and advantages of the invention will be apparent as the description herein progresses.

In the drawings:

FIGURE 4 is a bottom plan view of the clamp section disclosed in FIGURE 3;

FIGURE 5 is a side elevation view of the clamp section disclosed in FIGURE 3;

FIGURE 6 is a fragmentary sectional view taken substantially along the line 6—6 of FIGURE 4;

FIGURE 8 is a longitudinal sectional view of a sealed coupling between a conduit and a blank hub and including a clamp according to the invention subtending an angle of about 90 degrees of the clamp to illustrate one lug and one axial groove thereof; and FIGURE 9 is a sectional view similar to FIGURE 8 of another sealed coupling including a clamp according to the invention.

Figure 1:
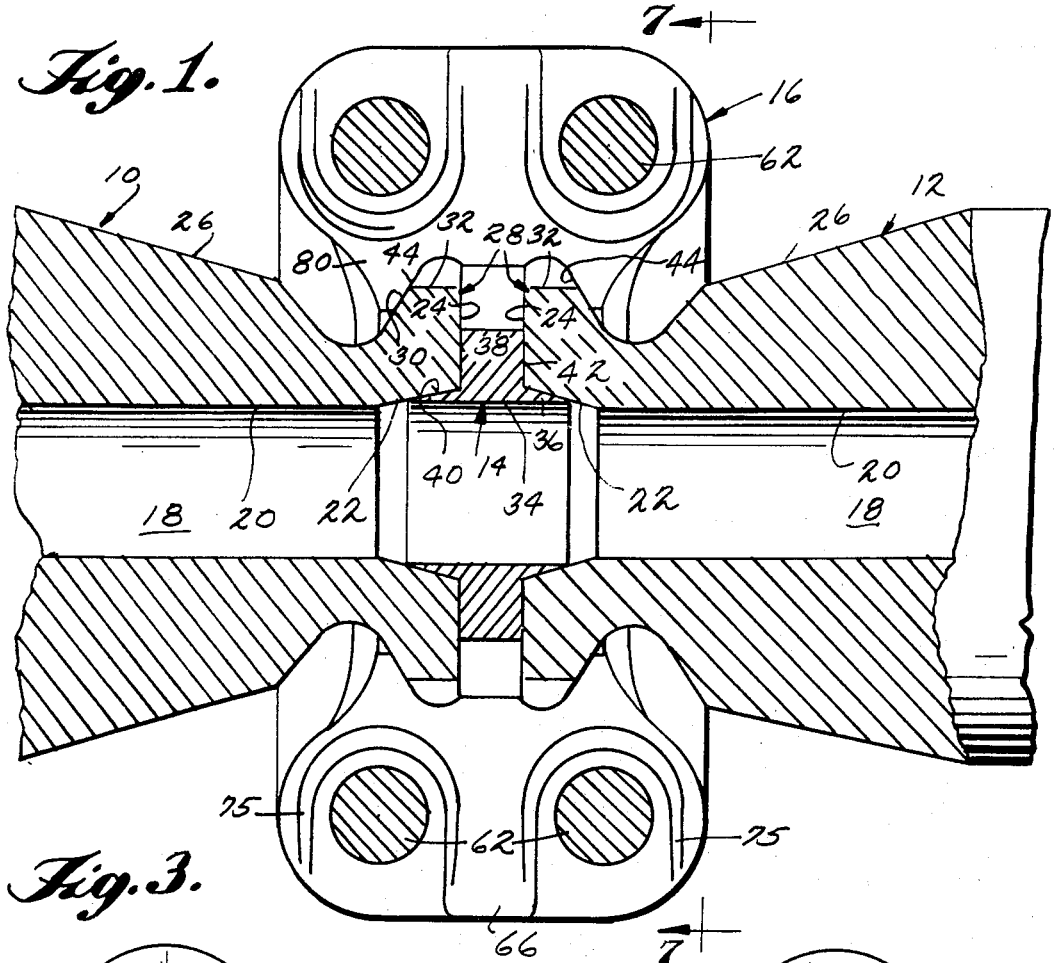
FIGURE 1 is a longitudinal section through the conduits and sealing ring held in position by the improved clamp.
Figure 3:
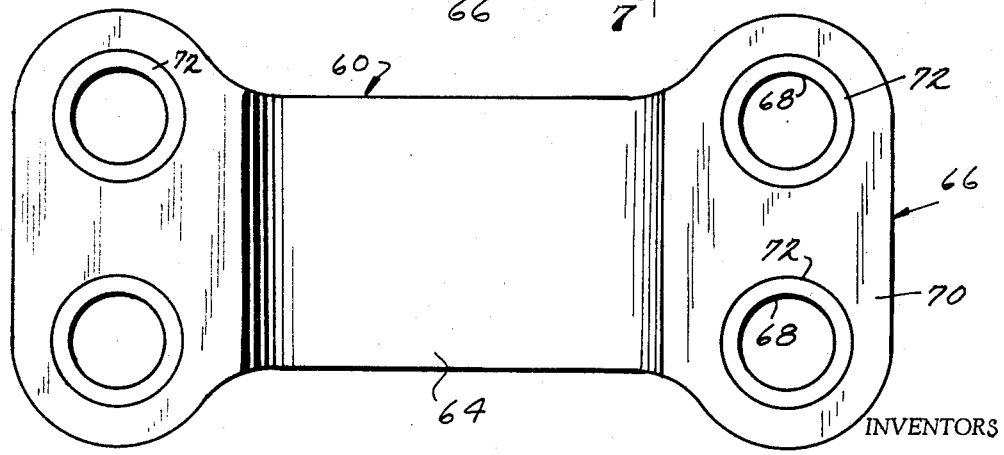
FIGURE 3 is a top plan view of one section of the clamp.

FIGURE 1 discloses a high pressure coupling comprising first and second conduit parts 10 and 12, a sealing ring 14 located between the conduit parts, an improved clamp 16 for forcing the conduit parts toward each other thus firmly gripping the sealing ring.

Each of the conduit parts 10 and 12 have aligned fluid passages 18 therein which are defined by inner walls 20, terminating in outwardly and forwardly flaring sealing surfaces 22, adjacent to the end surfaces 24 of the conduit parts. The exterior walls 26 of the conduit parts terminate in flanges 28 having outwardly and endwardly flaring surfaces 30 connected at their outermost point to the end surfaces 24 of the conduit parts by an axial surface 32.

The sealing ring 14 is adapted to be engaged between the conduit parts when coupled to form an effective seal. The ring 14, comprises an inner annular flange portion 34, from which oppositely disposed elastically deflectable lips 36 extend in a generally axial direction. A substantially centrally disposed external rib portion 38 is formed integrally with the flange portion 34. Each flexible lip is provided with an exterior sealing surface 40 which tapers away from the rib portion 38 at an obtuse angle with respect to the axial end surfaces 42 of the rib and preferably at a slightly smaller angle than those of the sealing surfaces of the parts to be sealingly coupled with respect to the rib when the lips are in their undeflected condition prior to making up the coupling. The lips are thus substantially triangular in cross-section. The external rib portion 38 is of relatively large thickness and length and has sides which constitute bearing surfaces 42 disposed preferably in planes normal to the axis of the sealing ring. The thickness of the rib is such that it limits the degree of movement of the conduit parts toward each other, in the coupling shown in FIGURE 1 so as to prevent overdeflection of the sealing ring lips beyond their elastic limits.

As will hereinafter be described in greater detail, the improved clamping means 16, of forged or cast metal to provide a strong and rugged clamp to be used with parts to be sealingly coupled and which are subject to extremely high pressure, is shown with interior bearing surfaces 44 of the clamp 16 acting upon the complementary wedging surfaces 30 of the parts being sealingly coupled. Thus, as the clamp is tightened, the interior bearing surfaces 44 force the complementary wedging surfaces 30 of the conduit parts toward one another. When the conduit parts are drawn toward one another, the inner sealing surfaces 22 of the conduit parts in turn wedge against the exterior tapered sealing surface 40 of the deflectable lips of the sealing ring to effect a high pressure seal in which the area subject to pressure is reduced to a diameter substantially equal to that of the passages.

The completed coupling shown in FIGURE 1 is exceedingly rigid inasmuch as the end surfaces 24 of the conduit parts are in firm contact with the sealing ring rib 38, and the sealing surfaces of the conduit parts are in firm sealing engagement with the tapered sealing surface 40 of the elastically deflected sealing ring lips 36. Thereafter, further flexing or movement in the coupling sufficient to cause leakage as a result of fluctuating pressures within the coupling, vibration, changes in temperature or the like is effectively precluded by the novel coupling structure provided according to the present invention. Wear, deformation, and leakage due to movement are also thus precluded. Furthermore, while it is necessary to make flange portions 28 of the conduit parts of such a size and thickness as to impart to them substantially rigidity, it is not necessary to make such size and thickness excessive as the clamp force is quite close to the body of the conduit, thus eliminating the excessive bending moments in the flanges.

The angularity of the wedging surfaces 30 and 44 of the conduit parts and clamp assembly respectively, in relation to the axial or longitudinal axis of the coupling must exceed 45° if substantial axially inward force is to be exerted on the conduit parts. The angularity of the wedging surfaces may effectively range from about 55° to about 85° with an angularity of 65° being preferred.

It will be appreciated that the sealing means may have other configurations beside that depicted in FIGURE 1 so long as it is essential to impart an axial force to the conduits to make an effective seal. Two other preferred sealing annuli are shown in the couplings of FIGURES 8 and 9 and will be discussed more fully hereinafter; further advantageously usable deflectable lip sealing annuli are illustrated in the above-mentioned Watts et al. applications.

While the improved clamp is illustrated in FIGURE 1 in a conduit coupling, it will be appreciated that such a clamp may be used not only in ordinary pipe connections but also in connections of oil well pipe, such as drill pipe, casing or tubing, flow line pipe, etc. In addition to its application to pipe, the clamp may be used in connections associated with oil well casing and tubing heads and hangers, master drilling valves and blow-out preventers and Christmas trees and other well head parts, pressure vessel closure assemblies, processing equipment manhole hatch cover assemblies and conduit blind flange including couplings.

Figure 2:
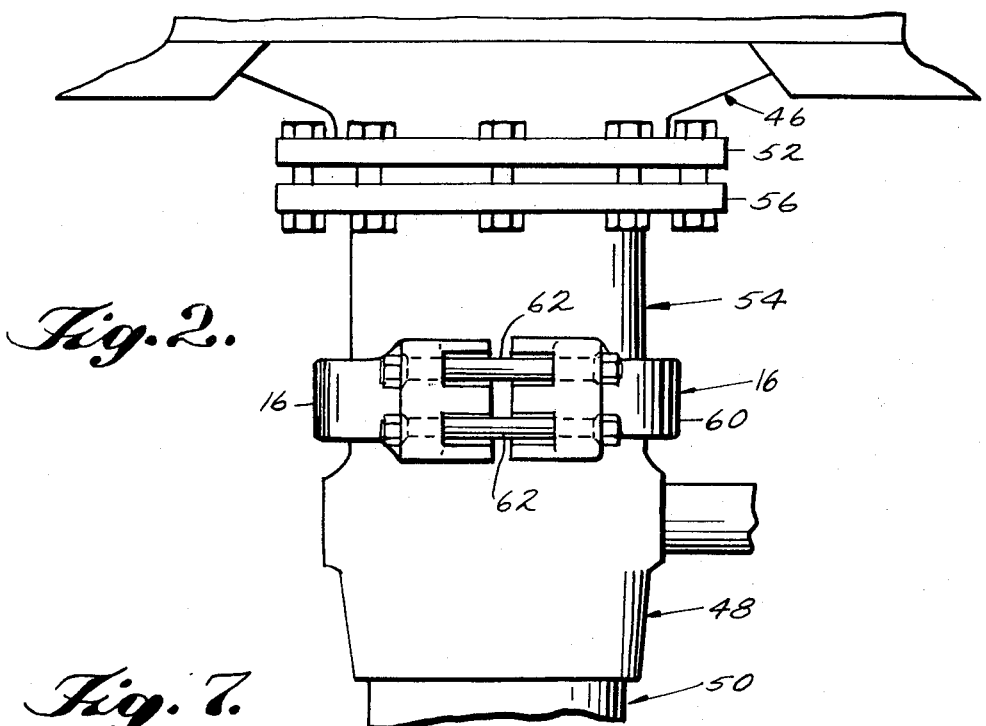
FIGURE 2 is a side elevational view of the improved clamp being used with standardized control equipment accommodating the clamp by means of an adapter.

FIGURE 2 illustrates the use of the improved clamp 16 in connection with a master drilling valve 46 and a casing head 48. The casing head 48 is connected at one end to the casing 50, and at its other end it terminates in a flange, not shown, similar to flange 28 of the conduit parts. The master drilling valve 46 is shown with a conversion ring joint flange 52. An adapter 54 is shown being used to connect the master drilling valve to the casing head 48, however, some such equipment may integrally include flange means arranged to be sealingly coupled to other parts utilizing a clamp 16. The adapter is provided with an upper flange 56 of the standard ring joint type to connect with the flange 52 of the master drilling valve. The lower end of the adapter is formed with a flange (not shown) similar to flange 28 of the conduit parts. The improved clamp 16 is then used to secure the adapter and the casing head as previously described and hereinafter to be described in greater detail.

Figure 7:
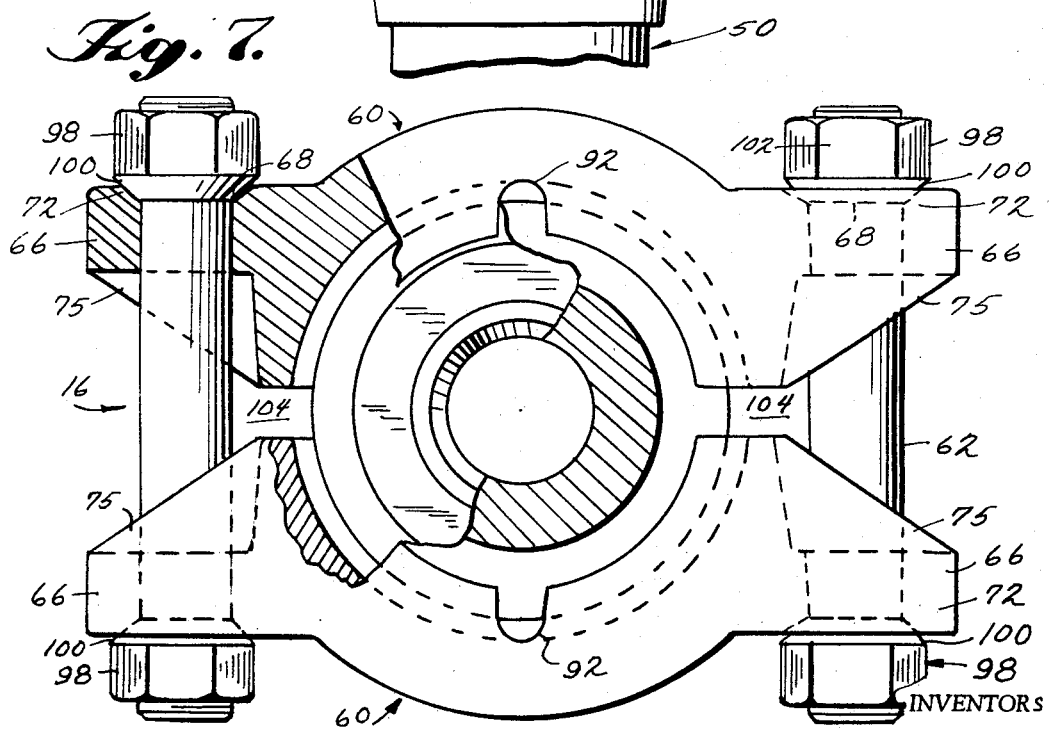
FIGURE 7 is a sectional view partially broken away taken substantially along the line 7—7 of FIGURE 1.

A section of the clamp is shown in its unassembled position in FIGURES 3 through 6. The clamp in its assembled position, as shown more clearly in FIGURES 2 and 7, is made up of a plurality of sections 60 held together by means of a plurality of bolts 62. Each section of the clamp comprises an arcuate segment 64 of substantial thickness. At each end of the arcuate segments 64 and formed integrally therewith is a lug 66 extending substantially radially outward from the associated arcuate segment. Each lug 66 has a pair of apertures 68 symmetrically disposed from the transverse axes of the generally annular clamp. The outer wall 70 of each lug 66 is generally flat, and each aperture 68 at the end thereof which is adjacent the outer wall 70 preferably has a recessed spherically curved seat 72. Each aperture 68 opens at its other end into a recess 74 formed in the inner wall of the lug. Each recess 74 is defined by axially spaced generally triangular webs 75 extending between the radially outer extent of each lug and the clamp segment ends. The walls 78 of the recess preferably taper away from the center line of the apertures as best seen in FIGURES 5 and 7.

Each of the segments 64 is provided at its inner surface with an arcuate radially inwardly extending rib 80 adjacent each axially spaced side thereof, shown having a generally trapezoidal cross-section. In particular the cross-section of the rib 80 as shown in FIGURE 4 includes a base portion 82 of substantial width integrally formed with the segment 64, and sides 44 and 84 which converge radially outwardly from the base portion to a truncation 86 substantially parallel to the base portion 82 of the rib. While the rib is provided with a truncated end 86 to eliminate low strength edges, it is possible that in some applications particularly where low pressures and small sized conduits are involved, the sides 44 and 84 may converge to form an edge. The inner sides 44 of the two ribs 80 form opposed tapered bearing surfaces, corresponding in taper or angularity to the wedging surfaces 30 (FIGURE 1) of the flange 28 of the conduits. Furthermore, the inner sides 44 of the ribs define a recess 88 therebetween. In the preferred embodiment, and as shown, an integral reinforcing rib 90 of substantial width is formed parallel to and disposed symmetrically between the ribs 80 and projects slightly radially inwardly from the root of the recess 88.

The ribs 80 and the reinforcing rib 90 are intersected by a groove 92 which extends generally parallel to the longitudinal axes of the clamp and in cross-section has an arcuate root 94 and diverging sides 96 extending outwardly from the transverse extent of the arcuate root. In the preferred form the groove 92 extends in depth to a point approximating the greatest depth of the recess 88 formed between the trapezoidal ribs. Also in the preferred form the radius of the arcuate root 94 of the groove 92 is 3/16 of an inch, and the sides of the groove diverge from a point tangent to the arcuate root at an angle of 7 degrees with respect to the longitudinal centerline of the groove as illustrated in FIGURE 5. While only one groove 96 is shown in each clamp segment, it is within the scope of this invention to intersect the ribs 80 and reinforcing rib 90 by a plurality of such grooves angularly spaced from one another.

In its assembled position, as shown in FIGURE 7, the sections of the clamp are joined by a plurality of bolts 62 extending through the apertures 68 and having nuts 98 threaded thereon to secure each bolt in the associated aperture. Each nut 98 is provided with a spherically curved surface 100 cooperating with the spherically curved seat 72 of the aperture and has a non-circular peripheral surface 102 of suitable design to receive a wrench.

As mentioned previously, in prior art clamps now generally in use as the lugs and arcuate segments are pulled together by tightening the nuts on the bolts extending through the lugs, an uneven stress begins to build up along the wedge bearing surfaces of the inner arcuate ribs of the clamp with the area of contact and pressure between the clamp and the conduit parts varying. This detrimental condition has been minimized according to the present invention by the inclusion of one or more grooves 92 in each clamp segment. As stresses begin to build up, each groove enables the associated arcuate segment including the arcuate ribs thereof to move relative to a point in the region of the center of the arcuate root 94 of the groove thus effectively maintaining the ribs in more uniform contact with the conduit parts. With the area of contact between the ribs and the conduit parts being more constant utilizing the clamp provided by the invention in such axially made-up couplings, the pressure between the two parts will also be more uniform. Accordingly, more uniform contact will be made with the sealing ring increasing the effectiveness of the seal under high pressures. It will be easily seen that when large pressures are employed, the strain across each arcuate segment above the arcuate root of the groove is considerable. Consequently, it is essential to provide each arcuate segment with considerable thickness. The provision of an arcuate root 94 for the groove instead of a root coming to an edge, eliminates the great concentration of strain at one particular point as would be the case with the latter-mentioned configuration.

Heretofore, as the clamp makeup nuts were tightened on the bolts, bending stresses would become incumbent upon the bolts as the substantially flat nut bearing surface of the lug rotated slightly about its base region thus bearing against the inner edge of the nut. The spherically curved seat 72 of the aperture and the spherically curved surface 100 of the nut enable the lug to rotate slightly without causing considerable bending stresses in the bolts.

As the two sections of the clamp are drawn together by tightening the bolts, the inner opposed tapered bearing surfaces 44 of the ribs act upon the flanged exterior bearing surface 30 of the conduit parts, applying considerable axial force to the conduit parts forcing them into a pressure-tight bearing relationship with the sealing ring 14 by deflecting the sealing ring lips into sealing surface to sealing surface contact with the conduit parts. Accordingly, the make-up is simple, is accomplished with little movement of the parts from the point of initial contact to that of final sealing engagement, and is extremely rapidly accomplished. The workmen can easily discern when the nuts have been properly tightened as the rib 38 of the sealing ring serves as a simple stopping means in the coupling embodiment of FIGURE 1. As shown in FIGURE 7 the clamp sections are designed so that when the assembly is completed, the clamp sections will not meet but will remain separated by spaces 104. While two clamp sections are shown, it will be apparent that three or more sections can also be employed.

Another coupling having the stresses incumbent thereon upon make-up more evenly distributed over the clamped elements and sealing means is shown in FIGURE 8.

The coupling 124 includes a conduit 126 presented endwardly toward a blank hub 128 arranged to seal off the conduit 126. Each of the conduit and hub carry a radially outwardly, axially endwardly annular wedging surface 130 thereon on the flanges 132, 134 of the conduit and hub. The wedging surfaces 130 correspond to the surfaces 30 shown in FIGURE 1 and are similarly engageable by the complementary annular wedging surfaces 44 of the clamp segments upon make-up of the clamp to draw the coupling elements 126, 128 axially toward one another.

Each of the conduit and hub also includes a radially outwardly, axially endwardly flaring annular shoulder 136 each defining a tapered annular sealing surface. As shown, an annular sealing ring 138 having two opposed axially endwardly and radially inwardly annular sealing surfaces 140 formed on the outside thereof, each of the surfaces 140 being cooperatively engaged by an element carried sealing surface 136.

Preferably the ring 138 is formed of elastic hard metal or the like and the surfaces 140, when the ring is unstressed being tapered at a lesser angle than the surfaces 140. Accordingly, upon make-up of the sealed coupling shown in FIGURE 8 by the tightening of the securement means including the bolts 62, the clamp 16 radially contracts and the clamp carried wedging surfaces 44 urge the elements 126, 128 into endwise abutment. At the same time the clamp induced axial movement of the conduit 126 and hub 128 toward one another effects the deflection of the ring sealing surfaces 140 into stressed sealing engagement with the sealing surfaces 136. It should be appreciated that the original taper angle difference between the surfaces 136 and 140 are correlatable with the axial length of these surfaces and the distance between the element wedging surfaces and the abutting element ends to insure that the abutment of the element ends will operate as a positive stop, limiting the deflection of the sealing ring sealing surfaces to an extent within the elastic limits of the material comprising the sealing ring. As with the embodiment shown in FIGURE 1, the novel clamp 16 including the axially extending rib-bridging grooves 92 and spherically curved securement members and securement receiving seats 100, 72 combine to more evenly distribute the stresses incumbent upon the coupling during make-up and usage than have prior art couplings similarly subject to high pressure during use.

Yet another embodiment of a sealed coupling advantageously employing a grooved clamp 16 according to the invention is shown in FIGURE 9. This embodiment is similar in many respects to that shown in FIGURE 8 but for the tapered sealing means being integral with the elements, shown as conduits 10', 12', to be sealed.

As shown, the conduit 10' includes an axially extending projection 142 having an axially endwardly, radially inwardly tapered annular sealing surface 144 on the radially outer side thereof which cooperatively engages an axially endwardly, radially outwardly tapered annular sealing surface 146 formed as an inner shoulder on the conduit 12' and leading to the end thereof.

Preferably the projection 142 is composed of elastic hard metal or the like and the surface 144 tapers at a shallower angle than the surface 146 when the projection is unstressed. Accordingly, when the coupling is made-up, the projection 142 including the surface 144 is deflected into stressed surface to surface sealing engagement with the sealing surface 146 of the conduit 12' and the abutting of the conduit ends 24' precludes the overstressing of the projection 142 beyond the elastic limits of the material thereof.

While preferred forms of the invention have been illustrated in the drawings and discussed above, it should be adequately clear that considerable modification may be made thereto without departing from the principles of the invention. Therefore, the foregoing should be considered in an illustrative sense rather than a limiting sense and accordingly the extent of this invention should be limited only by the spirit and scope of the claim appended hereto.

What is claimed is:

1. A coupling sealed against the leakage of fluid pressure comprising a plurality of complementary arcuate clamp segments; each segment including an arcuate element having two axially spaced arcuate sides, two angularly spaced ends, a radially inner wall and a radially outer wall; means defining a pair of axially spaced, radially inwardly projecting, generally parallel arcuate ribs on each clamp segment radially inner wall, each rib of each pair including an arcuate sealing surface generally facing the other rib of the pair and projecting radially inwardly of said segment and axially toward the nearest of the axially spaced clamp segment arcuate sides, thereby defining two axially spaced wedging surfaces on each segment substantially aligned with the like wedging surfaces on each other clamp segment; means defining at least one groove in each clamp segment extending substantially transversely to said ribs on said segment radially inner wall; each groove having a depth at least as great as the outward radial extent of each rib, said groove intersecting each rib on said segment; securement means on said segments adjacent each angularly spaced end thereof; each securement means comprising a substantially radially outwardly and axially extending lug closely adjacent each respective clamp segment and having means defining a laterally inner wall and a laterally outer wall; each lug having a pair of lateral apertures symmetrically disposed from the arcuate centerline of the clamp segment and extending between intersection with the respective lug laterally inner wall and the lug laterally outer wall, each aperture having means defining an outwardly concave spherically curved annular recess in the laterally outer wall of the respective lug peripherally immediately adjacent and radially inwardly delimited by each intersection of said apertures with said respective lug laterally outer wall, and each respective aperture being thereby constructed and arranged to receive against the respective spherically curved annular recess one bearing surface of a spherical bearing surface nut and bolt assembly and to receive the shank of the bolt of the bolt and nut assembly through the respective aperture; said securement means being arranged to secure said segments to one another defining a clamp and said securement means being manipulatable to effect radial expansion and contraction of said clamp; a pair of elements presented endwise with respect to one another to said clamp for sealingly coupling therewith; each element have a circumferentially extending, radially outwardly and axially endwardly tapering wedging surface thereon adjacent the end of the element presented toward the other element, each of said wedging surfaces being arranged for surface to surface engagement with the wedging surface of one of the pair of said clamp segment ribs of each clamp segment when said clamp is radially contracted to draw said element ends toward one another and surface to surface sealingly engageable means cooperatively carried by said elements adjacent said ends thereof for sealing said elements with respect to one another when said clamp is radially contracted; the last-mentioned surface to surface sealingly engageable means including an annular, axially extending tapered sealing surface carrying projection on the first of said elements and an annular tapered shoulder on said second element defining a sealing surface thereon cooperatively sealingly engaged by the sealing surface of said first element, the projection carried sealing surface, when in an unstressed condition, tapering at a more shallow angle with respect to the longitudinal axis of the clamp than the taper of the shoulder on the second element, and said projection being elastically deflected into stressed sealing engagement with the shoulder when the clamp is radially contracted.

References Cited

UNITED STATES PATENTS

| | | | |
|---|---|---|---|
| 951,704 | 3/1910 | Schmidt | 285—334.2 |
| 1,295,937 | 3/1919 | Stafford et al. | 85—32 |
| 2,628,596 | 2/1953 | Bachle | 285—367 X |
| 2,766,999 | 10/1956 | Watts et al. | 285—367 X |
| 2,862,731 | 12/1958 | Hedden et al. | 285—367 X |
| 3,216,746 | 11/1965 | Watts | 285—367 X |
| 3,251,615 | 5/1966 | Short | 285—367 X |

CARL W. TOMLIN, *Primary Examiner.*

R. G. BERKLEY, *Assistant Examiner.*